US011029219B2

(12) United States Patent
Monro et al.

(10) Patent No.: US 11,029,219 B2
(45) Date of Patent: Jun. 8, 2021

(54) FIBER BRAGG GRATING TEMPERATURE SENSOR

(71) Applicant: The University of Adelaide, Adelaide (AU)

(72) Inventors: Tanya Monro, Adelaide (AU); Stephen Warren-Smith, Adelaide (AU)

(73) Assignee: The University of Adelaide, Adelaide (AU)

( * ) Notice: Subject to any disclaimer, the term of this patent is extended or adjusted under 35 U.S.C. 154(b) by 657 days.

(21) Appl. No.: 15/542,986

(22) PCT Filed: Jan. 14, 2015

(86) PCT No.: PCT/AU2015/000011
§ 371 (c)(1),
(2) Date: Jul. 12, 2017

(87) PCT Pub. No.: WO2016/112422
PCT Pub. Date: Jul. 21, 2016

(65) Prior Publication Data
US 2018/0003571 A1   Jan. 4, 2018

(51) Int. Cl.
*G01K 11/00* (2006.01)
*G01K 11/3206* (2021.01)
*G02B 6/02* (2006.01)

(52) U.S. Cl.
CPC ........ *G01K 11/3206* (2013.01); *G02B 6/0208* (2013.01); *G02B 6/02123* (2013.01);
(Continued)

(58) Field of Classification Search
CPC .................................................. G01K 11/3206
See application file for complete search history.

(56) References Cited

U.S. PATENT DOCUMENTS 5,351,324 A * 9/1994 Forman ................ G09F 3/0376
250/227.14
6,647,160 B1   11/2003 Chi et al.
(Continued)

FOREIGN PATENT DOCUMENTS

JP       200142142 A     2/2001
WO   2011161196 A1    12/2011

OTHER PUBLICATIONS

Kostecki et al.; "Predicting the drawing conditions for Microstructured Optical Fiber fabrication"; 2014; Optical Materials Express; pp. 1-12; vol. 4:1.
(Continued)

*Primary Examiner* — Lisa M Caputo
*Assistant Examiner* — Nasir U. Ahmed
(74) *Attorney, Agent, or Firm* — The Webb Law Firm

(57) ABSTRACT

A temperature sensor and temperature sensing system for sensing changes in temperature up to a predetermined temperature is disclosed. The temperature sensor includes a microstructured optical fiber where the microstructured optical fiber includes a plurality of longitudinal channels extending along the microstructured optical fiber. The sensor also includes a fiber Bragg grating formed in the microstructured optical, fiber by generating a periodic modulation in the refractive index along a core region of the microstructured optical fiber. The fiber Bragg grating is operable to produce band reflection at a reflection wavelength that varies in accordance with changes in temperature at the core region of the optical fiber.

22 Claims, 6 Drawing Sheets

(52) U.S. Cl.
CPC ..... *G02B 6/02314* (2013.01); *G02B 6/02366* (2013.01); *G02B 2006/02161* (2013.01)

(56) References Cited

U.S. PATENT DOCUMENTS

| | | | |
|---|---|---|---|
| 7,110,646 | B2 | 9/2006 | Eggleton et al. |
| 7,483,615 | B2 | 1/2009 | Mihailov et al. |
| 7,835,605 | B1 | 11/2010 | Wang et al. |
| 7,848,607 | B2 | 12/2010 | Monro et al. |
| 8,588,267 | B1* | 11/2013 | Panak ............... G02B 6/425 372/6 |
| 2003/0174985 | A1* | 9/2003 | Eggleton ............. G02B 6/105 385/125 |
| 2004/0052444 | A1 | 3/2004 | Moslehi et al. |
| 2004/0213501 | A1 | 10/2004 | Chi et al. |
| 2005/0111793 | A1 | 5/2005 | Grattan et al. |
| 2006/0010921 | A1* | 1/2006 | Mori ............ G02B 6/02214 65/393 |
| 2006/0104582 | A1 | 5/2006 | Frampton et al. |
| 2007/0156212 | A1* | 7/2007 | Saxena ............. A61N 5/025 607/102 |
| 2009/0220785 | A1 | 9/2009 | Monro |
| 2010/0290062 | A1 | 11/2010 | Phan Huy et al. |
| 2011/0194805 | A1 | 8/2011 | Wang et al. |
| 2012/0324959 | A1 | 12/2012 | Smelser et al. |
| 2013/0187301 | A1* | 7/2013 | Pitwon ............ B29D 11/00663 264/1.27 |

OTHER PUBLICATIONS

Kostecki et al.; "Silica exposed-core microstructured optical fibers"; 2012; Optical Materials Express; pp. 1-10; vol. 2:11.

Nguyen et al.; "Molecular beacons immobilized within suspended core optical fiber for specific DNA detection"; 2012; Optics Express; pp. 1-8; vol. 20:28.

Warren-Smith et al.; "Exposed core microstructured optical fiber Bragg gratings: refractive index sensing"; 2014; Optics Express; pp. 1-10; vol. 22:2.

Warren-Smith et al.; "Fabrication, splicing, Bragg grating writing, and polyelectrolyte functionalization of exposed-core microstructured optical fibers"; 2014; Optics Express; pp. 1-12; vol. 22:24.

* cited by examiner

FIBER BRAGG GRATING TEMPERATURE SENSOR

CROSS-REFERENCE TO RELATED APPLICATION

This application is the United States national phase of International Application No. PCT/AU2015/000011 filed Jan. 14, 2015, the disclosure of which is hereby incorporated in its entirety by reference.

INCORPORATION BY REFERENCE

The following co-pending patent application is referred to in the description:

U.S. patent application Ser. No. 12/090,011 titled "METHOD AND DEVICE FOR FORMING A MICROSTRUCTURE FIBER", filed 12 Oct. 2006, assigned to the present assignee and whose contents are incorporated by reference in their entirety.

TECHNICAL FIELD

The present invention relates to temperature sensors. In a particular form, the present invention relates to an optical fiber based temperature sensor.

BACKGROUND

In many industrial processes the precise control of temperature is an important criterion for the production of the relevant end product and further to meet constraints such as emission standards and the like. To this end, a number of optical fiber based temperature sensors have been developed that rely on a variety of different physical processes.

One category of these fiber based temperature sensors are those that measure or sense the temperature at a single point or location along the fiber. One example of this type of temperature sensor is a fiber based sensor that relics on the temperature dependence of the fluorescence intensity ratio (FIR) of intensities from two spaced energy levels of a relevantly doped fiber to measure temperature. Other single point fiber based sensors include those based on interferometric measurements, such as Fabry-Perot interferometers and multi-mode interferometers, which determine locally the refractive index at the location of the interferometer. As the refractive index varies in a known way with the temperature of the fiber material, the temperature at the location of the interferometer may then be determined.

Another category of fiber based temperature sensors are those which are multipoint or multiplexed. These sensors allow the temperature to be measured at a number of discrete locations along the fiber. They are usually grating based, relying on long period gratings, chiral gratings or fiber Bragg gratings (FBGs) and a temperature dependent effect associated with the grating such as the movement of the transmission or reflection band for individual grating regions at locations along the fiber as a result of temperature dependent refractive index variations at these locations. By sufficiently separating the band reflection for each individual grating region, the temperature can be determined for each individual grating region corresponding to a location along the fiber. This is known as wavelength division multiplexing.

In the case of FBGs, these are formed by generating a periodic modulation in the refractive index along the optical fiber core. This results in a narrow band reflection at a particular designed wavelength, where this wavelength is sensitive to temperature due to the temperature response of the refractive index of glass. Wavelength division multiplexed (multi-point) sensing may then be achieved by forming multiple gratings with different pitch along the fiber, resulting in a unique reflected wavelength for each sensor element.

The multi-point sensing capability of FBGs, in conjunction with their high accuracy and precision, high speed, reflection mode operation, and well defined and small spatial resolution, make this type of sensor the design choice for many structural health monitoring temperature sensing applications. Unfortunately, as the FBGs are fabricated in photosensitive fibers using ultra-violet (UV) light, they are subject to a maximum operating temperature limit of approximately 500° C. due to the thermal annealing out of the refractive index modifications that occurs at these elevated temperatures. As a consequence, commercial FBG based temperature sensors are generally rated only to 250° C. or less, making them unsuitable for many high temperature sensing applications.

Some non-limiting examples where conventional FBG based temperature sensors may not be readily employed include smelting and furnace operations such as iron and zinc processing. To extract zinc from zinc slag, the zinc slag is vaporized in a slag fuming furnace where temperatures typically range between 1000° C. to 1100° C., but may go over 1200° C. Notably, in this highly corrosive and hot environment, standard electrical thermocouple based heat measurement devices do not survive for more than a few minutes. Electrical sensors also cannot provide multiplexed sensing. As these furnace operations are highly energy intensive, optimization of the process based on temperature control and monitoring can provide large efficiency gains.

There is therefore a need for a temperature sensor having the advantages of standard FBG based temperature sensors that is capable of measuring elevated temperatures.

SUMMARY

In a first aspect, there is provided a temperature sensor for sensing changes in temperature up to a predetermined temperature, including:

a microstructured optical fiber, the microstructured optical fiber including a plurality of longitudinal channels extending along the microstructured optical fiber;

a fiber Bragg grating formed in the microstructured optical fiber by generating a periodic modulation in the refractive index along a core region of the microstructured optical fiber, wherein the fiber Bragg grating is operable to produce band reflection at a reflection wavelength that varies in accordance with changes in temperature at the core region of the optical fiber.

In another form, the periodic modulation in the refractive index along the core region is formed by laser ablating defects along the core region of the microstructured optical fiber.

In another form, the structure of the microstructured optical fiber is configured to facilitate the laser ablating defects along the core region of the microstructured optical fiber.

In another form, the structure of the microstructured optical fiber includes a single longitudinal channel extending between the core region and an outer cladding portion of the microstructured fiber to provide laser access to the core region through only the cladding portion.

In another form, the cross-sectional geometry of the single longitudinal channel is configured to assist the focusing of a laser on the core region for the laser ablating of defects along the core region of the microstructured fiber.

In another form, the cross-sectional geometry of the single longitudinal channel includes a substantially planar core region for the ablation of defects.

In another form, the cross-sectional geometry of the single longitudinal channel includes a substantially planar outer surface to the cladding portion.

In another form, the cross-sectional geometry of the single longitudinal channel includes a substantially planar inner surface to the cladding portion.

In another form, the structure of the microstructured optical fiber includes an open longitudinal channel extending along the core region, the open longitudinal channel providing direct laser access to the core region.

In another form, the structure of the microstructured optical fiber is configured to facilitate single mode guidance of electromagnetic radiation along the microstructured optical fiber.

In another form, a selection of the plurality of longitudinal channels extending along the microstructured optical fiber are configured to facilitate single mode guidance by having an average or effective refractive index that satisfies the single mode condition for propagation of electromagnetic radiation along the microstructured optical fiber.

In another form, the microstructured optical fiber is formed of silica material and the sensor is configured for a predetermined temperature of at least 1000° C.

In another form, the microstructured optical fiber is formed of silica material and the sensor is configured for a predetermined temperature of at least 1350° C.

In another form, the microstructured optical fiber is formed of silica material and the sensor is configured for a predetermined temperature of at least 1550° C.

In another form, the microstructured optical fiber is formed of sapphire crystal and the sensor is configured for a predetermined temperature of at least 1600° C.

In another form, the microstructured optical fiber is formed of sapphire crystal and the sensor is configured for a predetermined temperature of at least 2000° C.

In a second aspect, there is provided a temperature sensor according to the first aspect, the temperature sensor including a second fiber Bragg crating formed in the microstructured optical fiber by generating a periodic modulation in the refractive index along a second core region of the microstructured optical fiber, the second core region spaced apart from a first core region of a first fiber Bragg grating, wherein the second fiber Bragg grating is operable to produce band reflection at a second reflection wavelength distinct from a first reflection wavelength of the first fiber Bragg grating, the second reflection wavelength varying in accordance with changes in temperature at the second core region of the optical fiber.

In a third aspect, there is provided a temperature sensing system including:

a source of electromagnetic radiation;

a temperature sensor according to the first aspect, the temperature sensor interfaced to the source of electromagnetic radiation;

a detector for detecting the reflection wavelength of the band reflection from the core region of temperature sensor where the fiber Bragg grating is located, the detector interfaced to the temperature sensor; and a data processor for determining the temperature at the core region based on the shift of the reflection wavelength.

In another form, the detector for detecting the reflection wavelength detects a reflected optical signal from the fiber Bragg grating of the temperature sensor.

In another form, the detector for detecting the reflection wavelength detects a transmitted optical signal from the fiber Bragg grating of the temperature sensor.

In another form, the source of electromagnetic radiation and the detector for detecting the reflection wavelength are combined.

In a fourth aspect, there is provided a multiplexed temperature sensing system including:

a source of electromagnetic radiation;

a temperature sensor according to the second aspect, the temperature sensor interfaced to the source of electromagnetic radiation;

a detector for detecting the first reflection wavelength of the band reflection from the first core region where the first fiber Bragg grating is located and the second reflection wavelength of the band reflection from the second core region where the second fiber Bragg grating is located, the detector interfaced to the temperature sensor; and a data processor for determining the temperature at both the first core region and the second core region of the temperature sensor based on the respective shifts of the first reflection wavelength and the second reflection wavelength.

In another form, the source of electromagnetic radiation and the detector for detecting the first and second reflection wavelengths are combined.

In a fifth aspect, there is provided a method for sensing the temperature at a location:

deploying the temperature sensor system of the third aspect so that the core region is located the location;

detecting a shift in the reflection wavelength of the band reflection of the temperature sensor; and determining the temperature at the location based on the shift in reflection wavelength.

In a sixth aspect, there is provided a method for sensing the temperature at a first location and a second location including:

deploying the multiplexed temperature sensing system of the fourth aspect so that the first core region is located at the first location and the second core region is located at the second location;

detecting respective shifts in the first reflection wavelength and the second reflection wavelength of the temperature sensor; and determining the temperatures at the first and second locations based on the respective shifts in first and second reflection wavelengths.

BRIEF DESCRIPTION OF DRAWINGS

Embodiments of the present invention will be discussed with reference to the accompanying drawings wherein.

DESCRIPTION OF EMBODIMENTS

Figure 1:
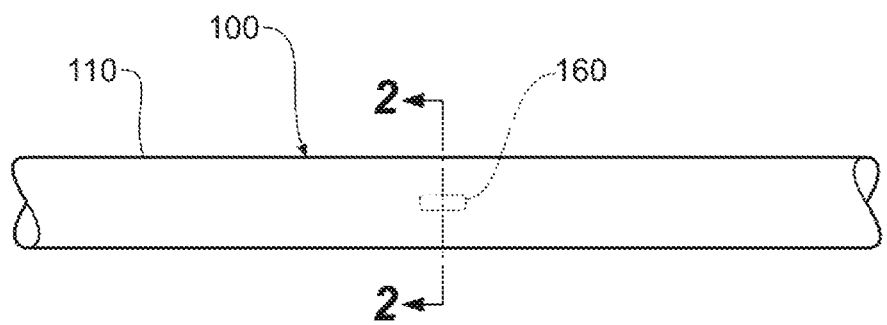
FIG. 1 is a figurative top view of a temperature sensor in accordance with an illustrative embodiment.
Figure 2:
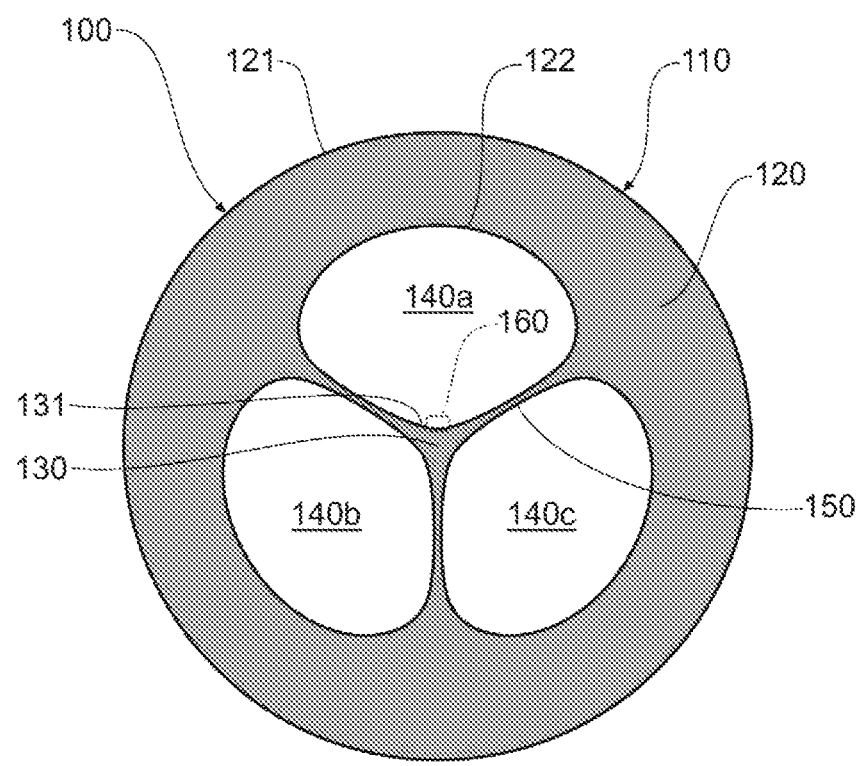
FIG. 2 is a figurative end-sectional view of the temperature sensor illustrated in FIG. 1.

Referring now to FIGS. 1 and 2, there are shown top figurative and side sectional views of a temperature sensor 100 according to an illustrative embodiment. In this embodiment, temperature sensor 100 is configured for sensing temperatures up to at least 1350° C. and is formed of a microstructured optical fiber (MOF) 110 formed of silica material. In this example, the silica material is a commercially available high purity fused silica, F300HQ™, available from Heraeus Quarzglas GrmbH & Co KG. As would be appreciated, silica melts at temperatures of approximately 2000° C. and as such provides a fiber material having excellent temperature characteristics for measuring elevated temperatures from at least 500° C. and potentially up to a maximum temperature of approximately 1600° C.

Microstructured optical fiber 110 is configured as a suspended core (SC) MOF and as best seen in FIG. 2 includes an outer cladding or jacket region 120 and an inner suspended core 130 that extends longitudinally along temperature sensor 100. The core 130 is in this example is supported by three equiangular radially extending struts 150 that extend from the core 130 to the jacket region 120, in turn forming three inter-strut channels 140a, 140b, 140c surrounding the core 130 and which extend longitudinally along temperature sensor 100.

Figure 3:
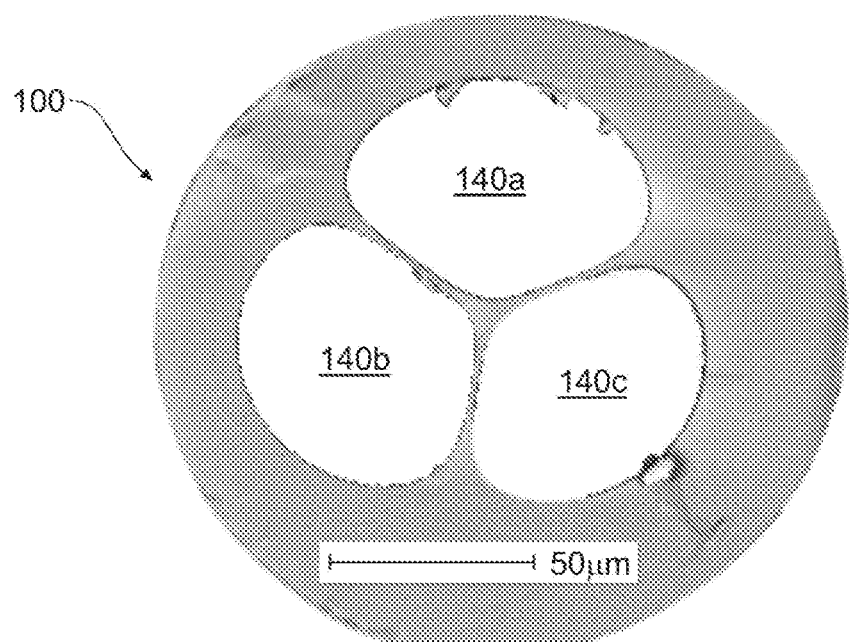
FIG. 3 is an image of the end-sectional view of the temperature sensor illustrated in FIGS. 1 and 2.

As best seen in FIG. 3, in this illustrative embodiment the outer diameter of the SC-MOF is approximately 160 μm and the core diameter is approximately 8 μm with the three holes or channels each having a diameter of approximately 50 μm. As would be appreciated, the outer diameter may range from 50 μm to 1000 μm, but typically ranges from 80 μm to 200 μm. The core diameter may also vary from 0.5 μm to 20 μm, but typically ranges from 2 μm to 12 μm. In addition, the diameter of the holes may vary from 5 μm to 100 μm, but typically ranges from 10 μm to 60 μm. The number of holes for this type of SC configuration may also vary from two to seven, but is typically three.

In this embodiment, optical fiber 110 is fabricated by first creating a preform by ultrasonic drilling (20 kHz) three holes or channels around the center of a 12 mm F300HQ™ silica rod in an equilateral triangular pattern. This preform is then drawn into a fiber employing a 6 m tall drawing tower with a graphite resistance furnace running at 2000° C. operating at a preform feed rate of 1 mm/min and with a positive internal pressure applied into the holes of the preform of 8-12 mbar. The fiber draw speed is selected so that the resulting drawn fiber has an outer diameter of 160 um.

Other processes for forming microstructured fibers include extrusion of the fiber preform. Techniques and apparatus directed to this method of fabrication are discussed in U.S. patent application Ser. No. 12/090,011 titled "METHOD AND DEVICE FOR FORMING A MICROSTRUCTURE FIBER", filed 12 Oct. 2006, assigned to the present assignee and incorporated by reference in its entirety.

Incorporated into the microstructured optical fiber is a fiber Bragg grating (FBG) 160 which in this example is formed along a region of the core 130. In broad terms, FBGs are formed by creating a periodic modulation in the refractive index of an optical fiber. The FBG causes a narrowband reflection at the location of the grating at the Bragg or reflection wavelength ($\lambda_B$), where $\lambda_B$ is linearly dependent both on the pitch ($\Lambda$) of the periodic modulation and the refractive index (n).

This narrowband reflection then causes a dip in the transmission spectrum and a peak in reflection at $\lambda_B$. As the temperature of a material increases, the refractive index also increases. This then causes a shift in the position of the reflection wavelength $\mu_B$ a higher wavelength. Similarly, if the temperature decreases, the refractive index of the material reduces and the position of $\lambda_B$ will shift to a lower wavelength. As this wavelength shift of $\lambda_B$ can be directly related to the change in refractive index, which in turn may be directly associated with the change in temperature, monitoring of the value of $\lambda_B$ will allow temperature to be determined.

Figure 4:
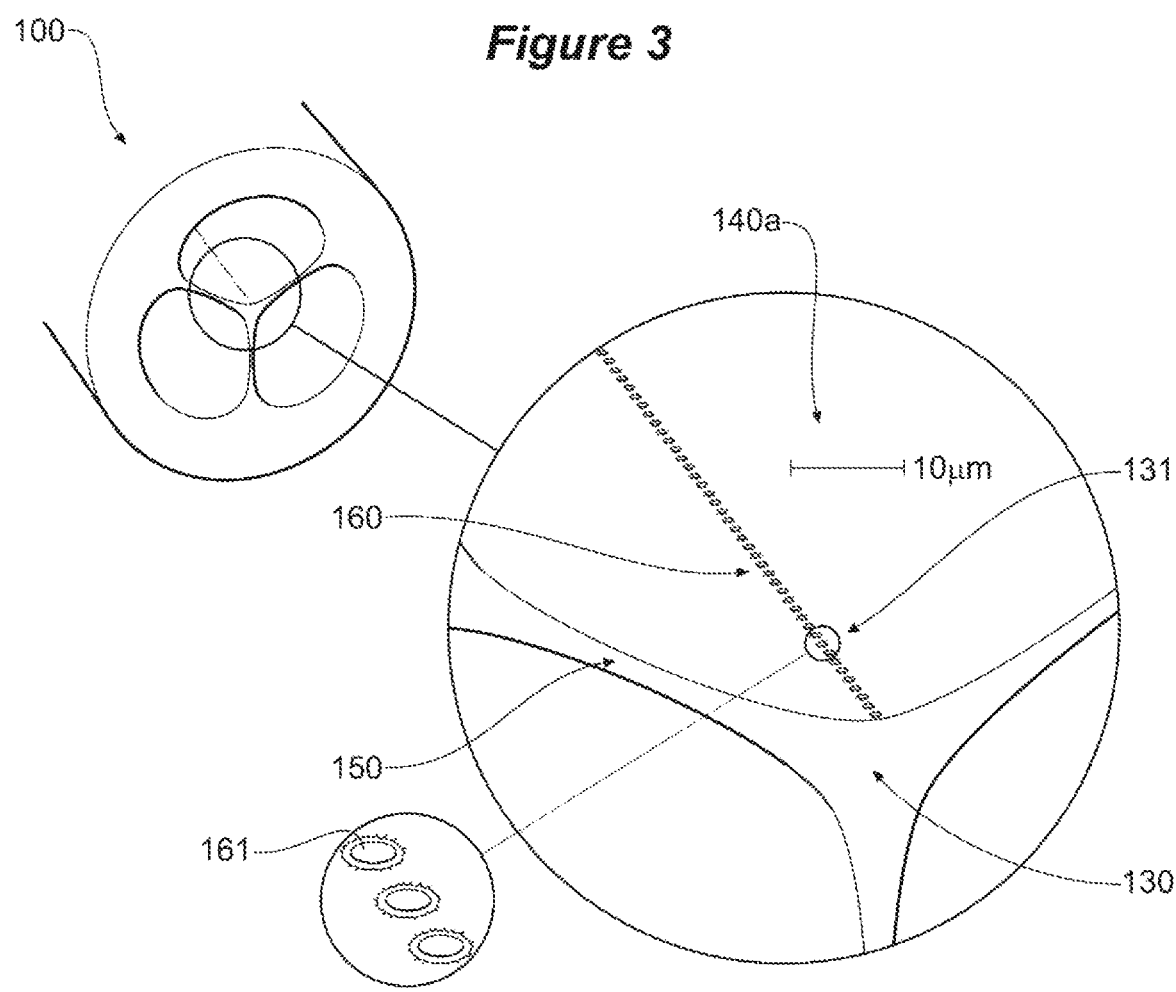
FIG. 4 is a detailed perspective view of the FBG region of the temperature sensor illustrated in FIG. 1 depicting the ablated defects formed in the core region.

In this embodiment, the fiber Bragg grating 160 is written into or ablated into an outer surface portion or core region 131 of the core 130 by the use of a femtosecond laser which generates a periodic modulation in the refractive index by physical removal of material to produce defects in the form of a series of cavities or holes 161 (also known as "nanoholes") along the core 130 (as best seen in FIG. 4). In this embodiment, the cavities have an approximate size of 600 nm and a depth of 600 nm. In other embodiments, the size may range from 100 nm to 1000 nm and the depth may range from 100 nm to 5000 nm.

The hole width may somewhat exceed, but cannot greatly exceed, the FBG pitch so as to maintain a degree of periodicity. The depth of the holes influences the sensor loss and signal strength. Deeper holes will create a greater refractive index contrast and therefore contribute to a stronger signal, but may increase sensor loss and potentially limit the multiplexing capability. Deeper holes may also allow for shorter gratings to be written. In this example, the length of the FBG is approximately 20 mm, but as would be appreciate the length may range from 0.1 mm to 100 mm depending on requirements.

In this embodiment, the focused femtosecond laser beam used to write the fiber Bragg grating 160 need only pass through two glass-air interfaces, ie, through the outer surface 121 of the cladding or jacket region 120 of MOF 110 and then through the inner surface 122 of the cladding region 120. In this manner, the structure of the microstructured optical fiber, in having a single longitudinal laser access channel extending 140a between the core 130 and the cladding region 120, is configured to facilitate the laser ablating of cavities along the core region as access to the core 130 is provided to the ablating laser through cladding region 120.

In this embodiment, the modifications are ablated into fibers made of pure silica and as a result form physical defects in the core 130. Accordingly, FBG 160 will survive up to the point where the fused silica material begins to soften at the softening point of the silica material which is around 1600° C. While in this embodiment, the temperature sensor is configured for measuring temperatures up to at least 1350° C., a temperature sensor according to the above embodiment will continue to function in the elevated temperature regimes above 1350° C. and approaching the softening point. As such, a temperature sensor according to the above embodiment may also be configured and appropriately calibrated to sense changes in or measure temperatures up to at least 1375° C., 1400° C. 1425° C., 1450° C., 1475° C., 1500° C., 1525° C., 1550° C. or 1575° C.

Referring now to FIG. 4, there is shown the inscribed FBG 160 formed by femtosecond laser ablation. As would be apparent in this illustrative embodiment, FBG 160 is inscribed or ablated onto the core 130 through the outer and inner surfaces of cladding region 120 and via laser access channel 140a. In this example, FBG 160 is written into the core 130 using an 800 nm femtosecond Ti:Sapphire laser (Hurricane, Spectra Physics) system. The Bragg grating is written by focusing the femtosecond laser beam at the glass surface of the optical fiber core 130 by focusing through outer cladding 120 and ablating a series of cavities or holes 161 in the MOF core 120 to form defects in the core region 131 as described above.

In this example, the laser is pulsed at 100 Hz with pulse energy of 450 nJ and focused with a long working distance 50× microscope objective. The fiber is translated at a speed calculated to yield a second order Bragg grating with 1080 nm pitch at a wavelength of approximately 1550 nm. In this example, the length of the fiber is approximately 1 meter, while the length of the FBG is 20 mm, resulting in approximately 18,500 points being inscribed into the core 130. As would be appreciated, the SC-MOF must be appropriately mounted with applied tension to ensure that the entire core region being inscribed is at the focal plane of the femtosecond laser. This is because any deviations of the plane of the prospective inscribed region from the focal plane of the femtosceond laser of the order of 2 μm or more may result in insufficient intensity to create the required cavities.

In order to determine that the femtosecond laser beam is forming the required physical defects in the core 130, a red emitting laser may be coupled to the core 130 such that scattering of red light is observed when the FBG 160 is being formed.

Figure 5:
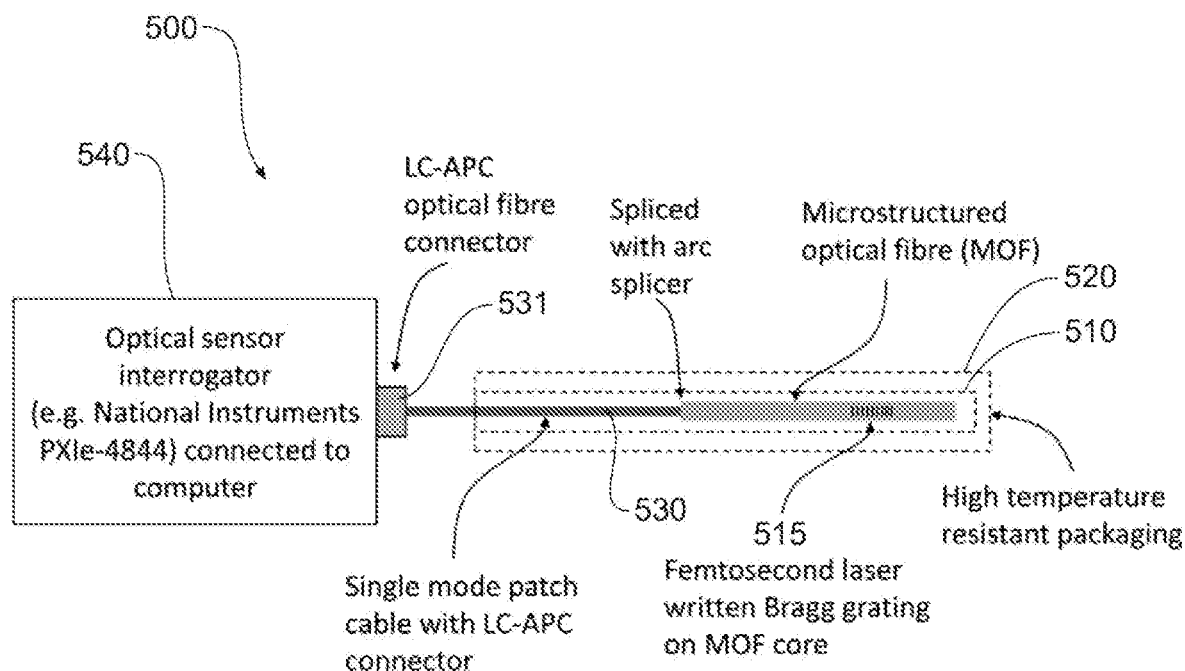
FIG. 5 is a figurative block diagram of a temperature sensing system in accordance with an illustrative embodiment.

Referring now to FIG. 5, there is shown a figurative block diagram of a temperature sensor system 500 according to an illustrative embodiment incorporating a temperature sensor 510 in accordance with the embodiments described here. In this embodiment, the temperature sensor 510, comprising a SC-MOF with a femtosecond written FBG 515, is spliced onto a conventional single mode fiber 530. The splice is achieved by conventional arc splicing techniques. In this example, a Fujikura™ FSM-100P™ are splicer is employed adopting a current of 4.0 mA below the standard single mode fiber setting and a main current duration of 3.0 seconds as compared to the standard duration of 2.0 seconds.

Single mode fiber 530 is terminated at its other end by a standard fiber optic connector 531 such as a LC/APC connector which is connected to optical sensor interrogator 540 to detect the reflection wavelength of the band reflection from temperature sensor 510. An optical sensor interrogator is an electro-optic device that combines a source of electromagnetic radiation generated over a predetermined wavelength range for input into an optical fiber, and a receiver for receiving at a predetermined sampling frequency reflected electromagnetic radiation from the optical fiber. The optical sensor interrogator then determines the optical power versus wavelength of this reflected radiation (eg, see FIG. 6). These devices often have multiple input channels for multiple optical inputs.

In this example, optical sensor interrogator 540 is a National Instruments™ PXIe-4844™ having four optical channels each generating an optical signal over a 80 nm wavelength range of 1510 to 1590 nm and measuring the reflected optical signal with a wavelength accuracy of 1 μm. Optical sensor interrogator 540 may be connected to a personal computer (PC) running appropriate software or other customized data processors for analysis. In one example, where optical sensor interrogator 540 is interfaced to a PC, the PC runs software that allows an operator to identify multiple FBG sensors on the optical input and parses the data to allow individual analysis of the respective data pertaining to each FBG sensor.

While temperature sensing system 500 employs an optical sensor interrogator using a swept wavelength source, it would be appreciated that a separate source of electromagnetic radiation or initial optical signal might be employed combined with an interferometer arrangement to measure any wavelength shift. In one embodiment, a white light source such as an incandescent bulb or super continuum source may function as the source of electromagnetic radiation. In one example, the separate electromagnetic source may be coupled to a fiber optical circulator which incorporates temperature sensor 510 in the through port and an electromagnetic radiation spectrum detector in the reflected port. The electromagnetic spectrum detector may include, but not be limited to a spectrometer, optical spectrum analyser or Fabry-Perot interferometer.

As would be appreciated, a temperature sensing system 500 in accordance with the above described embodiment may also be applied in transmission mode where instead of measuring a reflected optical signal and detecting and determining the presence and shift of a spectral peak corresponding to the reflection wavelength in the reflection spectrum, the temperature sensing system measures a transmitted optical signal and detects the presence of an absorption dip corresponding to the reflection wavelength the transmission spectrum and determines the shift of the absorption dip to determine the temperature.

In this example, the temperature sensor 510, comprising the SC-MOF interfaced or joined to single mode fiber 530 (ie, the spliced SC-MOF) is inserted into a protective sheath or housing 520 formed in this embodiment of high temperature resistant ceramic material. The temperature resistant ceramic material is selected based on the expected maximum temperature to be sensed and includes, but is not limited to, materials such as bisque-fired alumina (1427° C.), full-fired alumina (1649° C.) or yttria stabilized zirconia (1800° C.) Sheath or housing 520 may be selected to assist in protecting the spliced SC-MOF from other environmental factors including, but not limited to, the presence of corrosive materials and/or structural stresses.

In other embodiments, spliced SC-MOF is inserted into a sheath or housing comprising a stainless steel tube. In yet other embodiments, spliced SC-MOF may be inserted into a sheath or housing formed of silica material. Housing 520 is configured to receive the spliced SC-MOF and in some examples the inner diameter of temperature resistant housing 520 is substantially matched to the outer diameter of the SC-MOF FBG based temperature sensor 510. In other embodiments, there may be an air gap formed between housing 520 and the SC-MOF FBG based temperature sensor 510. Accordingly, the inner diameter of housing may range between 50 μm to 20 mm. The outer diameter of housing 520 is selected to provide the required flexibility or rigidity for the expected environment and may range between 100 μm to 50 mm with larger outer diameters providing increased rigidity if required.

In another embodiment, protective housing 520 includes using two or more concentric tubes or sheaths formed of either the same or different material. In one non limiting example, the spliced SC-MOF may be inserted into a silica tube, which is in-turn inserted into a ceramic tube. In one embodiment, the silica tube may have an inner diameter of 0.8 mm to 1.2 mm and an outer diameter greater than 1.5 mm, which is then inserted into a ceramic tube with inner diameter greater than the outer diameter of the silica tube and an outer diameter greater than 10 mm. In this example, temperature sensor 510 is configured to be in direct contact with an identical material, thereby reducing potential issues associated with a mismatch in thermal expansion between sensor 510 and protective housing 520.

In a further embodiment, the spliced SC-MOF may for installation purposes incorporate a sacrificial housing that is selected not to survive the expected high temperatures to be sensed. As a non-limiting example, the sacrificial housing may be formed of a plastic or polymer material which will melt at high temperatures but which assists in installing the sensor.

As would be appreciated a protective housing 520 is not necessarily required in all sensing environments but will depend on requirements.

Figure 6:
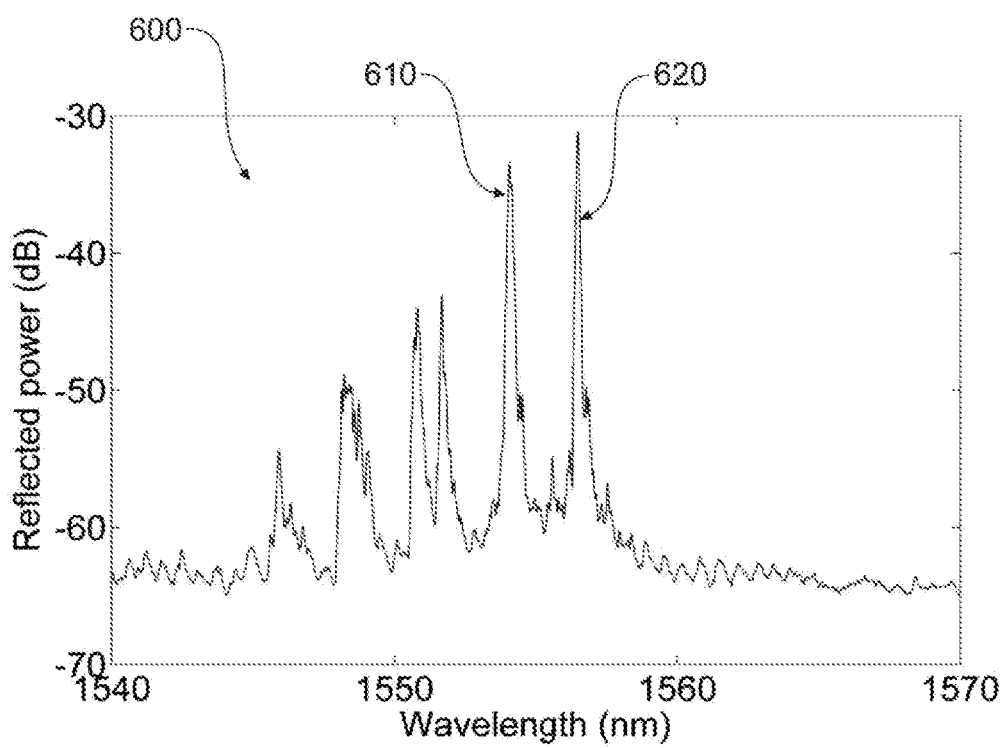
FIG. 6 is a reflected optical power spectrum as a function of wavelength as measured by the temperature sensing system illustrated in FIG. 5.

Referring now to FIG. 6, there is shown a graph 600 of the reflected power (dB) versus wavelength (nm) of the reflected optical signal as measured by temperature sensing system 500 from the SC-MOF FBG based temperature sensor 510 illustrated in FIG. 5. As would be appreciated, the SC-MOF FBG based temperature sensor 510 may not necessarily be single-mode and in this example there are peaks associated with the fundamental mode 620 and higher order modes 610.

Figure 7:
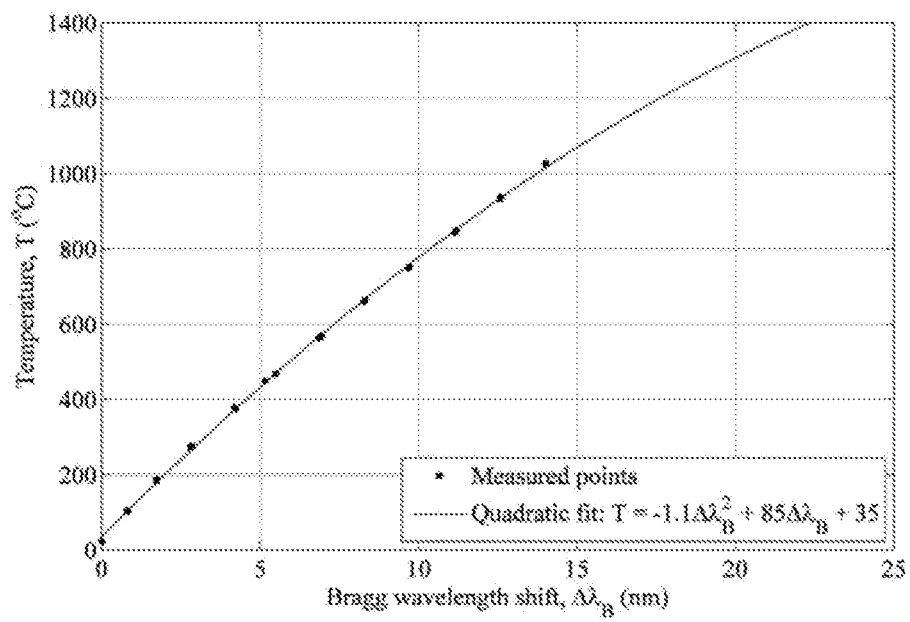
FIG. 7 is a graph of the shift in reflection wavelength as a function of temperature as measured by the temperature sensing system illustrated in FIG. 5 further depicting a quadratic fit to the data.

As described previously, temperature is then determined from power spectrum 600 by in turn measuring the shift in reflection wavelength of one or more of these peaks as monitored by optical sensor interrogator 540. In this example, based on a SC-MOF formed of fused silica material, the expected wavelength shift as a function of temperature for temperature sensing system 500 is essentially linear up to a temperature of 200° C. For temperatures beyond 200° C. the wavelength shift in the reflected Bragg wavelength, $\lambda_B$, transitions to a non-linear dependence best represented by a quadratic function, as illustrated in FIG. 7.

The coefficients of the respective linear and quadratic dependence functions are determined by a calibration procedure involving measuring wavelength shifts at increasing temperatures. As would be appreciated, other higher order fitting functions may be used or spline based fitting methods to determine the temperature based on the shift in $\lambda_B$. In this example, the shift in reflection wavelength $\lambda_B$ for temperatures up to 1000° C. is up to 15 nm. For temperatures up to 1400° C., the shift in $\lambda_B$ is up to 25 nm. For temperatures higher than 1400° C. the shift in $\lambda_B$ is then greater than 25 nm. As would be appreciated, the fitting function may be customized to provide a higher accuracy over a particular temperature range relevant to the expected temperature environment where the sensor is to be deployed.

Figure 8:
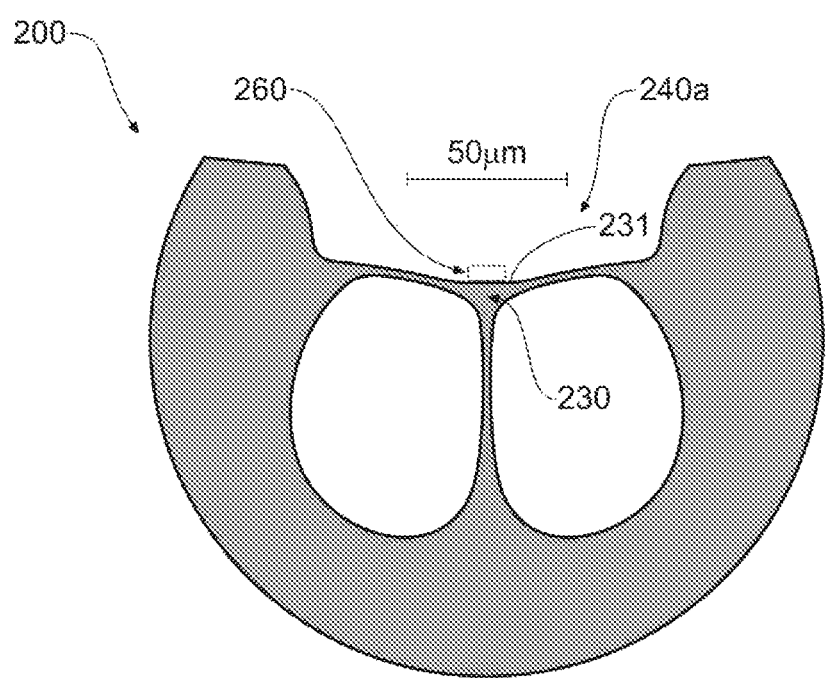
FIG. 8 is a figurative end-sectional view of a temperature sensor according to a further illustrative embodiment.

Referring now to FIG. 8, there is shown a temperature sensor 200 according to another illustrative embodiment based on an exposed core (EC) MOF configuration which is a variant of a SC-MOF. In this example, the FBG 260 is written directly onto the exposed core 230 through open longitudinal channel 240a. As would be appreciated, EC-MOF is configured to facilitate laser ablating along the core 230 where an outer surface portion or core region 231 of core 230 is completely exposed for access by the ablating laser. The EC-MOF configuration is fabricated in a similar manner as the SC-MOF FBG based temperature sensor referred to above, except that instead of drilling three holes or channels into the preform in a triangular configuration, one of the holes is substituted with a 1 mm slot that is cut into the preform that corresponds to longitudinal channel 240a once the fiber is drawn.

Figure 9:
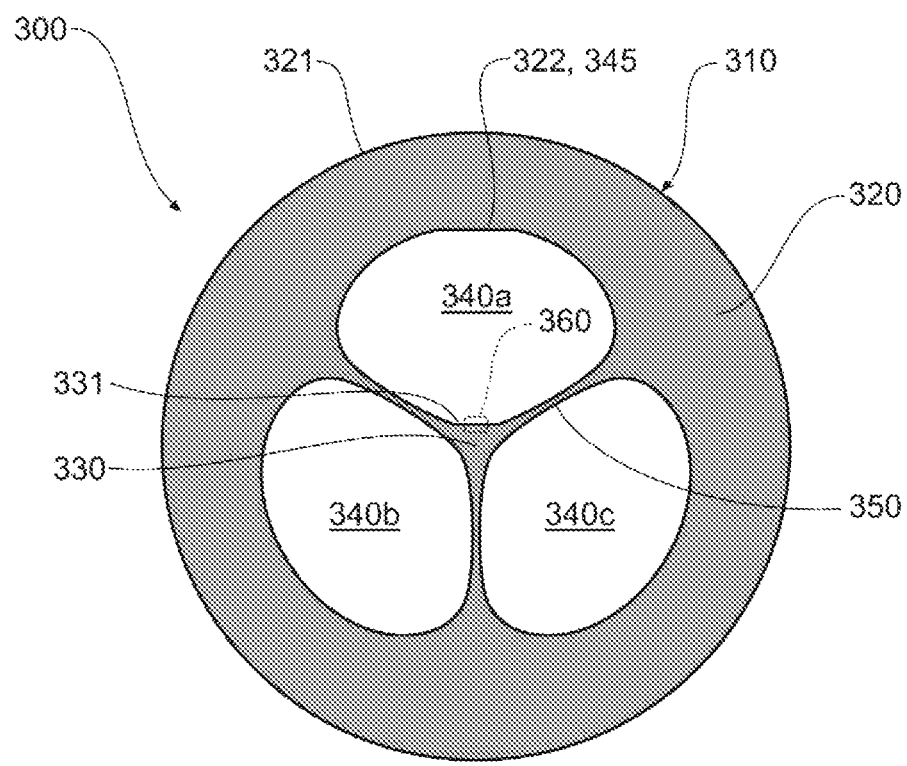
FIG. 9 is a figurative cud-sectional view of a temperature sensor according to another illustrative embodiment.

Referring now to FIG. 9, there is shown a cross-sectional view of a temperature sensor 300 based on a SC-MOF 310 where the cross-sectional geometry of the longitudinal channel 340a has been configured to assist the focusing of the laser to form FBG 360. In this example, longitudinal laser access channel 340a includes a substantially planar outer surface 345 (corresponding to the inner surface 322 of the cladding portion 320). This planar outer surface 345 assists in the focusing of the laser on the core 330. In addition, in this example, the outer surface portion or core region 331 of core 330 has been modified to be substantially planar so as to further assist in the focusing of the ablating laser by providing a uniform surface in which FBG 360 is formed.

Figure 10:
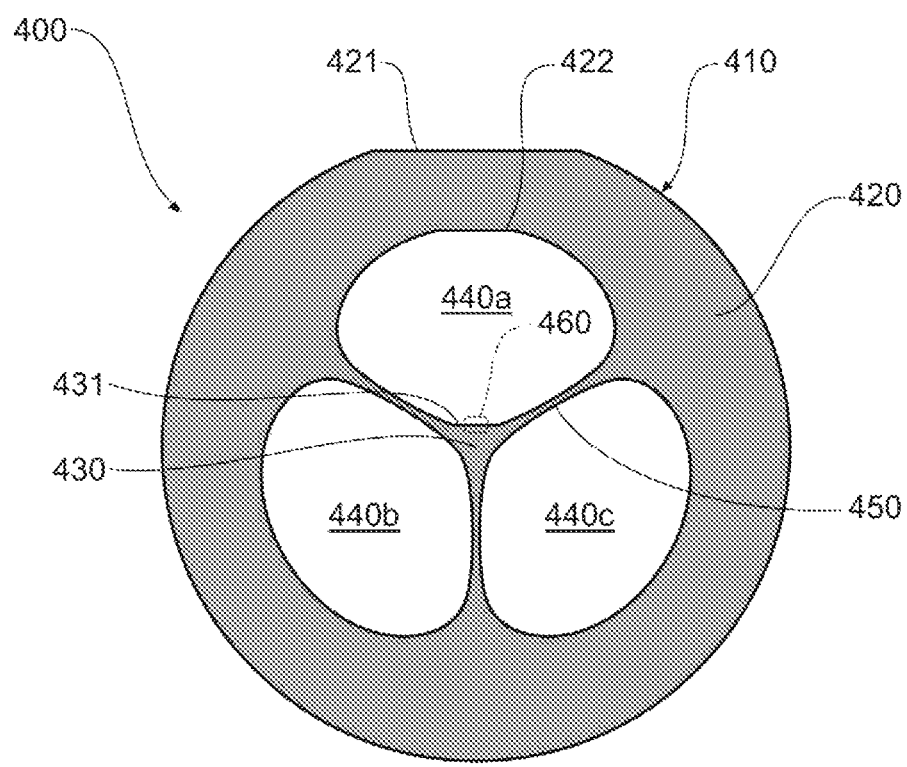
FIG. 10 is a figurative end-sectional view of a temperature sensor according to yet another illustrative embodiment.

Referring now to FIG. 10, there is shown a cross-sectional view of a temperature sensor based on a SC-MOF 410 similar to that illustrated in FIG. 9, except that the cross-sectional geometry of the outer cladding surface 421 of cladding region 420 corresponding to longitudinal laser access channel 440a is now also substantially planar to also assist in the focusing of the ablating laser on core region 431 to form FBG 460. While in this embodiment, both the outer cladding surface 421 and inner cladding surface 422 are both planar in the laser access region, it will be appreciated that the inner cladding surface 422 need not necessarily be planar. As would be appreciated, the thickness of cladding region 420 above the location of FBG 460 may be also be reduced to facilitate the ablating process.

Figure 11:
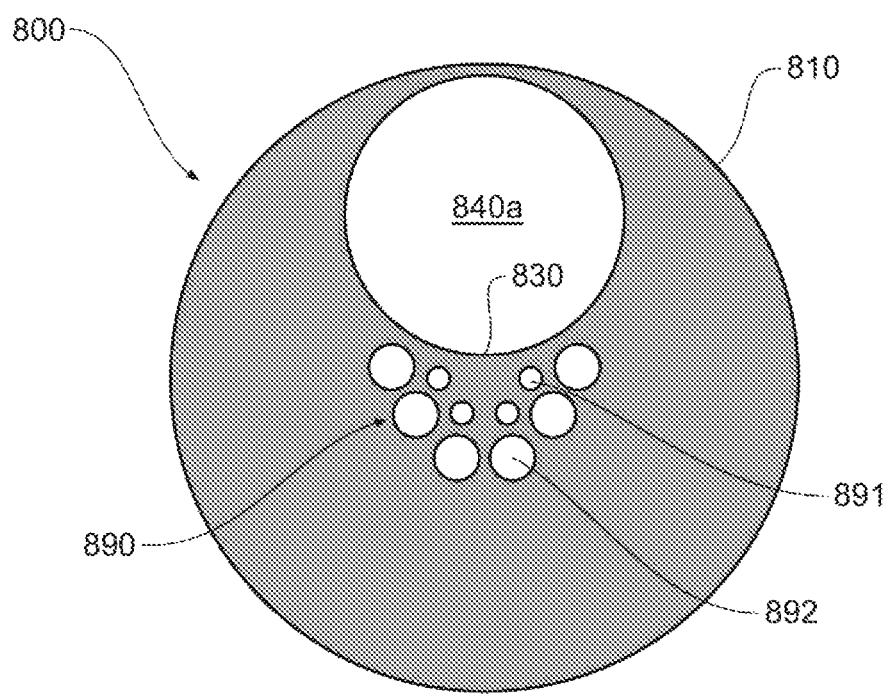
FIG. 11 is a figurative end-sectional view of a temperature sensor according to another illustrative embodiment.

Referring now to FIG. 11, there is shown a cross-sectional view of a temperature sensor 800 based on a SC-MOF 810 that has been configured to facilitate single mode guidance. In this illustrative embodiment, SC-MOF 810 includes a longitudinal laser access channel 840a configured to facilitate the laser ablating of cavities along the core 830 as previously described. To facilitate single mode guidance there is formed a plurality of regularly spaced longitudinal channels 890 located generally opposed to access channel 840a. Longitudinal channels 890 are arranged concentrically with respect to and part surround core 830, together forming the single mode type channels of SC-MOF 810. In this example, the single mode type channels 890 are circular in cross-section with the outer part ring of channels 891 having a larger diameter than the inner part ring of channels 892.

As would be appreciated the number, the exact size, spacing and configuration of the single mode type channels may be modified but with the overall governing condition that the average (or effective) refractive index of the cladding incorporating the single mode type channels satisfies the single mode condition. In the case where the fiber may be subject to substantial flexing or bending, the single mode type channels may be configured to be of a sufficient size and minimum spacing to reduce the effects of bend loss.

While the above embodiments have been described with reference to the use of fused silica material for a temperature sensor capable of sensing measuring temperatures up to a maximum temperature of 1600° C., at which stage the softening of the silica material will begin to affect the behavior of the FBG, other materials may be used depending on the expected maximum temperature to be sensed. Some of these materials and the associated maximum temperature include, but are not limited to, flame fused silica up to a maximum temperature of 1660° C., electrically fused silica up to maximum temperature of 1710° C. and sapphire crystal operating up to a maximum temperature of 2030° C.

As would be appreciated, the above described embodiments may operate as a threshold temperature sensor where a minimum shift in reflection wavelength then indicates that a predetermined temperature has been reached.

While the material that the MOF FBG based temperature sensor is formed from will provide an upper limit due to the softening of the material affecting the performance of the FBG, it will be appreciated that the temperature sensor may be configured to meet a requirement for measuring up to at least a predetermined temperature. Accordingly, a MOF FBG based temperature sensor may be optimized for sensing changes in or measuring temperatures up to at least: 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., 1000° C., 1025° C., 1050° C., 1075° C., 1100° C., 1125° C., 1150° C., 1175° C., 1200° C., 1225° C., 1250° C., 1275° C., 1300° C., 1325° C., 1350° C., 1375° C., 1400° C., 1425° C., 1450° C., 1475° C., 1500° C., 1525° C., 1550° C., 1575° C., 1600° C., 1625° C., 1650° C., 1675° C., 1700° C., 1725° C., 1750° C., 1775° C., 1800° C., 1825° C., 1850° C., 1875° C., 1900° C., 1925° C., 1950° C., 1975° C., 2000° C. or 2025° C., by suitable adoption of appropriate material and configuration of the MOF and FBG.

As one non-limiting example, a MOF FBG based temperature sensor in accordance with the above embodiments formed from sapphire crystal material may be designed to measure a temperature up to at least 1600° C. and in one example may be configured to sense changes in or measure temperatures up to at least 2025° C.

In other embodiments, the glass material used to form the MOF may be improved in strength by thermal annealing at any stage during the fabrication process. This thermal annealing process may occur prior to drawing the fiber from a preform, after drawing the fiber, or after writing the FBG using a femtosecond laser. The annealing is achieved by raising the temperature close to the relevant annealing temperature, approximately 1100° C. for fused silica, and lowering the temperature slowly. In one example, the rate of decrease of temperature may be in the range of 0.1 to 10° C./min.

As would be appreciated, a temperature sensor in accordance with the above described embodiments may incorporate multiple FBGs each associated with their own core region located along the MOF for sensing the temperature at multiple locations along the MOF. In line with conventional multiplexing techniques, each FBG is selected to have a different pitch resulting in a unique reflection wavelength associated with the band reflection for each of the FBGs. Each of these reflection wavelengths will then individually shift in accordance with the temperature at the location of the respective FBG providing temperature measurements at these locations. Depending on requirements, the temperature range for each FBG may be tuned for the expected temperature at that location recognizing that the maximum temperature that may be sensed for the entire sensor will be determined by material properties of the MOF.

In one example, a temperature sensor house within a fused silica tube and in-turn inserted into an alumina ceramic tube may be inserted into a furnace through the side-wall. If the furnace contains molten metal products, such as zinc slag, the sensing component of temperature sensor, in this example, may penetrate into the molten material.

As would be appreciated, the above described embodiments provide a significant improvement over conventional FBGs based sensors in that the range of temperature capable of being measured is increased without any loss of functionality or convenience over conventional systems.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A temperature sensor for sensing changes in temperature up to a predetermined temperature, comprising:
   a microstructured optical fiber, the microstructured optical fiber including a plurality of longitudinal channels extending along the microstructured optical fiber between a core region and an outer cladding portion of the microstructured optical fiber; and
   a fiber Bragg grating formed in the microstructured optical fiber by generating a periodic modulation in the refractive index along the core region of the microstructured optical fiber, wherein the periodic modulation in the refractive index along the core region comprises ablated defects, the ablated defects comprising a series of cavities where material has been physically removed from an outer surface portion along the core region of the microstructured optical fiber, wherein the fiber Bragg grating is operable to produce band reflection at a reflection wavelength that varies in accordance with changes in temperature at the core region of the optical fiber.

2. The temperature sensor of claim 1, wherein the structure of the microstructured optical fiber is configured to facilitate the laser ablating defects along the core region of the microstructured optical fiber.

3. The temperature sensor of claim 2, wherein one of the plurality of longitudinal channels provides laser access to the core region through only the cladding portion.

4. The temperature sensor of claim 3, wherein the cross-sectional geometry of the single longitudinal channel is configured to assist the focusing of a laser on the core region for the laser ablating of defects along the core region of the microstructured optical fiber.

5. The temperature sensor of claim 4, wherein the cross-sectional geometry of the single longitudinal channel includes a substantially planar core region for the ablation of defects.

6. The temperature sensor of claim 4, wherein the cross-sectional geometry of the single longitudinal channel includes a substantially planar outer surface to the cladding portion.

7. The temperature sensor of claim 4, wherein the cross-sectional geometry of the single longitudinal channel includes a substantially planar inner surface to the cladding portion.

8. The temperature sensor of claim 2, wherein the structure of the microstructured optical fiber includes an open longitudinal channel extending along the core region, the open longitudinal channel providing direct laser access to the core region.

9. The temperature sensor of claim 1, wherein the structure of the microstructured optical fiber is configured to facilitate single mode guidance of electromagnetic radiation along the microstructured optical fiber.

10. The temperature sensor of claim 9, wherein a selection of the plurality of longitudinal channels extending along the microstructured optical fiber are configured to facilitate single mode guidance by having an average or effective refractive index that satisfies the single mode condition for propagation of electromagnetic radiation along the microstructured optical fiber.

11. The temperature sensor of claim 1, wherein the microstructured optical fiber is formed of silica material and the sensor is configured for a predetermined temperature of at least 1000° C.

12. The temperature sensor of claim 1, wherein the microstructured optical fiber is formed of silica material and the sensor is configured for a predetermined temperature of at least 1350° C.

13. The temperature sensor of claim 1, wherein the microstructured optical fiber is formed of silica material and the sensor is configured for a predetermined temperature of at least 1550° C.

14. The temperature sensor of claim 1, wherein the microstructured optical fiber is formed of sapphire crystal and the sensor is configured for a predetermined temperature of at least 1600° C.

15. The temperature sensor of claim 1, wherein the microstructured optical fiber is formed of sapphire crystal and the sensor is configured for a predetermined temperature of at least 2000° C.

16. The temperature sensor according to claim 1, further comprising a second fiber Bragg grating formed in the microstructured optical fiber by generating a periodic modulation in the refractive index along a second core region of the microstructured optical fiber, the second core region spaced apart from the core region of the fiber Bragg grating, wherein the second fiber Bragg grating is operable to produce band reflection at a second reflection wavelength distinct from the reflection wavelength of the fiber Bragg grating, the second reflection wavelength varying in accordance with changes in temperature at the second core region of the microstructured optical fiber.

17. A multiplexed temperature sensing system comprising:
 a source of electromagnetic radiation;
 a temperature sensor as claimed in claim 16, the temperature sensor interfaced to the source of electromagnetic radiation;
 a detector for detecting the reflection wavelength of band reflection from the core region where the fiber Bragg grating is located and the second reflection wavelength of band reflection from the second core region where the second fiber Bragg grating is located, the detector interfaced to the temperature sensor; and
 a data processor for determining the temperature at both the core region and the second core region of the temperature sensor based on the respective shifts of the reflection wavelength and the second reflection wavelength.

18. The multiplexed temperature sensing system of claim 17, wherein the source of electromagnetic radiation and the detector for detecting the reflection wavelength and the second reflection wavelength are combined.

19. A temperature sensing system comprising:
 a source of electromagnetic radiation;
 a temperature sensor as claimed in claim 1, the temperature sensor interfaced to the source of electromagnetic radiation;
 a detector for detecting a reflection wavelength of a band reflection from the core region of the temperature sensor where the fiber Bragg grating is located, the detector interfaced to the temperature sensor; and
 a data processor for determining a temperature at the core region based on the shift of the reflection wavelength.

20. The temperature sensing system of claim 19, wherein the detector for detecting the reflection wavelength detects a reflected optical signal from the fiber Bragg grating of the temperature sensor.

21. The temperature sensing system of claim 19, wherein the detector for detecting the reflection wavelength detects a transmitted optical signal from the fiber Bragg grating of the temperature sensor.

22. The temperature sensing system of claim 19, wherein the source of electromagnetic radiation and the detector for detecting the reflection wavelength are combined.

* * * * *